(12) United States Patent
Iler

(10) Patent No.: US 7,443,221 B2
(45) Date of Patent: Oct. 28, 2008

(54) SYSTEM AND METHOD FOR FULLY DIGITAL CLOCK DIVIDER WITH NON-INTEGER DIVISOR SUPPORT

(75) Inventor: John Iler, Burlington, MA (US)

(73) Assignee: Broadcom Corporation, Irvine, CA (US)

( * ) Notice: Subject to any disclaimer, the term of this patent is extended or adjusted under 35 U.S.C. 154(b) by 64 days.

(21) Appl. No.: 11/135,929

(22) Filed: May 23, 2005

(65) Prior Publication Data

US 2006/0017486 A1    Jan. 26, 2006

Related U.S. Application Data

(60) Provisional application No. 60/573,109, filed on May 21, 2004.

(51) Int. Cl.
*G06F 1/04* (2006.01)
(52) U.S. Cl. .................................. 327/291; 327/293
(58) Field of Classification Search ................. 327/291, 327/293–295, 113–115, 117
See application file for complete search history.

(56) References Cited

U.S. PATENT DOCUMENTS

| | | | | |
|---|---|---|---|---|
| 5,736,893 A | * | 4/1998 | Puckette et al. ............. | 327/551 |
| 6,127,863 A | * | 10/2000 | Elliott ........................ | 327/115 |
| 6,795,519 B2 | * | 9/2004 | Chakravarthy ............... | 377/48 |
| 6,861,881 B1 | * | 3/2005 | Neravetla et al. ........... | 327/115 |
| 6,914,464 B2 | * | 7/2005 | Maeda ........................ | 327/156 |
| 6,928,127 B2 | * | 8/2005 | Mack et al. .................. | 375/371 |
| 6,931,243 B2 | * | 8/2005 | Goldman ..................... | 455/260 |
| 7,023,948 B2 | * | 4/2006 | Roth et al. ................... | 375/376 |
| 7,024,171 B2 | * | 4/2006 | Gibbs ......................... | 455/260 |
| 7,036,032 B2 | * | 4/2006 | Mizuyabu et al. ........... | 713/323 |
| 7,042,258 B2 | * | 5/2006 | Booth et al. ................ | 327/115 |
| 7,072,633 B2 | * | 7/2006 | Gomez et al. ............... | 455/260 |

* cited by examiner

*Primary Examiner*—Lincoln Donovan
*Assistant Examiner*—Hai L. Nguyen
(74) *Attorney, Agent, or Firm*—McAndrews, Held & Malloy, Ltd.

(57) ABSTRACT

A system and method that use a first clock to digitally generate a second clock, wherein the ratio of the frequency of the first clock to the frequency of the second clock is a non-integer. Circuitry may be used to ensure that the first clock, or input clock, has a frequency at least equal to the highest of the desired output frequencies. The input clock may be used to generate several output clocks with different frequencies. If one of the output clocks has the same frequency as the input clock, the circuitry can be bypassed. The different clocks may be used to drive parts of a system, each of which may require a different frequency.

12 Claims, 4 Drawing Sheets

SYSTEM AND METHOD FOR FULLY DIGITAL CLOCK DIVIDER WITH NON-INTEGER DIVISOR SUPPORT

RELATED APPLICATIONS

This patent application makes reference to, claims priority to and claims benefit from U.S. Provisional Patent Application Ser. No. 60/573,109, entitled "System and Method for Fully Digital Clock Divider with Non-integer Divisor Support," filed on May 21, 2004 by John Iler, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Digital circuits often include multiple clocks that must have a specific frequency relationship. In order to prevent drift of operation in one clock domain with respect to another, that relationship is sometimes very precise. If the relationship between the frequencies is integral, a simple clock divider may be used. However, if the relationship is non-integral, more involved circuitry is used.

For example, in audio/visual systems there may be an audio decoder that runs at one clock speed and a video decoder that runs at another speed. As a result, the audio decoder and the video decoder need to each run in their own clock domain, but they have to have a specific relationship to each other that remains stable over time. The reason being, if, for example, a DVD is being played, there must be lip sync, where the sound coming out should be lined up on a frame-by-frame basis with the video. Otherwise, the audio and video drift apart over time and the sound gets a few seconds behind the video.

In the simplest of cases, there may be an integral relationship between the audio decoder and video decoder clocks. For example, the video clock may be exactly three times as fast as the audio clock, in which case a simple digital clock divider is used to have the audio played at one-third the frequency of the video. A more likely situation is where the clocks have a non-integral relationship. For example, one clock may run 5/9 as fast as another clock.

Typically when 2 clocks must have a specific non-integral frequency relationship they are created using one or two phase locked loops (PLLs). PLLs have the characteristic that they enable the generation of output clocks at any reasonable rational ratio of output to the input. One method used to achieve the non-integral relationship is by generating one clock using a PLL driven off of another clock generated by a PLL. With this method, an input clock and a first PLL are used to generate a first (video) clock. The generated first clock is then input into a second PLL to generate a second (audio) clock.

Another method used to achieve the non-integral relationship is by using two PLLs to generate two clocks using the same input clock. Using this method, an input clock is used with one PLL to generate a first (video) clock. The same input clock is also used with a second PLL to generate a second (audio) clock.

Use of PLLs introduces analog circuits into the design. Relative to digital circuits, analog circuits generally are more difficult to make reliable due to their greater noise susceptibility and sensitivity to component processing variations. Additionally, PLLs are generally an expensive solution in terms of ASIC die area, or component cost on a board, relative to a fully digital solution. Furthermore, PLLs usually come with a variety of restrictions in their allowed programming values (e.g. minimum/maximum internal oscillator frequencies, min/max feedback/input/output divider values). Because PLLs require special components (e.g. capacitors), extra chip fabrication steps (extra cost/time/complexity) may be required relative to the baseline process typically used for digital circuits. PLLs also have many restrictions since they have internal oscillators that have to run within certain ranges and they have input and output dividers that can only operate in certain ranges.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for processing video, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Aspects of the present invention generally relate to using digital solutions to generate clocks running at different speeds in a system. More specifically, aspects of the present invention relate to using digital solutions to generate clocks with different frequencies that have a non-integral relationship.

Figure 1A:
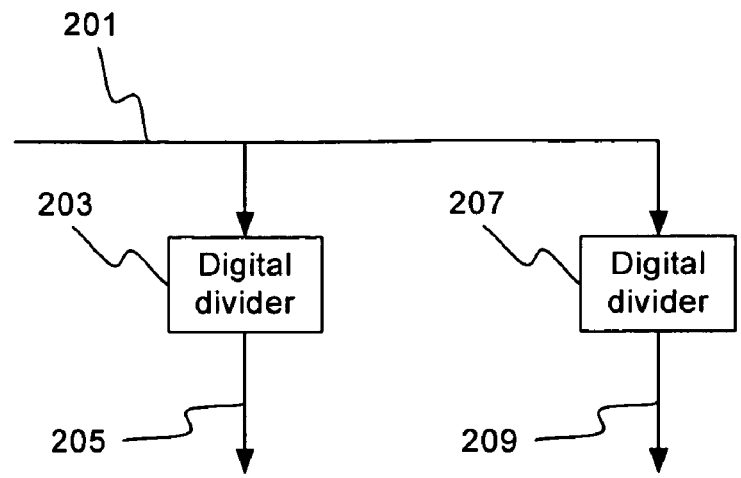
FIG. 1A illustrates a block diagram of an exemplary use of a digital divider to generate clocks with frequencies having a non-digital relationship, in accordance with an embodiment of the present invention.

FIG. 1A illustrates a block diagram of an exemplary use of a digital divider to generate clocks with frequencies having a non-digital relationship, in accordance with an embodiment of the present invention. A source clock 201 coming in may have a frequency that may be used by a portion of the system. For example, the clock may be at a frequency suitable for video-related content and applications. It may be desirable to generate another clock with a frequency suitable to process, for example, audio-related content and applications. The video clock 205 and the audio clock 209 may have frequencies with a non-integral rational relationship relative to each other or to the source clock 201. In an embodiment of the present invention, a digital divider 203 may use the source clock 201 to generate the first clock 205, and a digital divider 207 may use the source clock 201 to generate the second clock 209. In an embodiment of the present invention, the source clock 201 may be equal to the desired first clock 205, in which case the digital divider 203 may not be needed or may be bypassed.

Figure 1B:
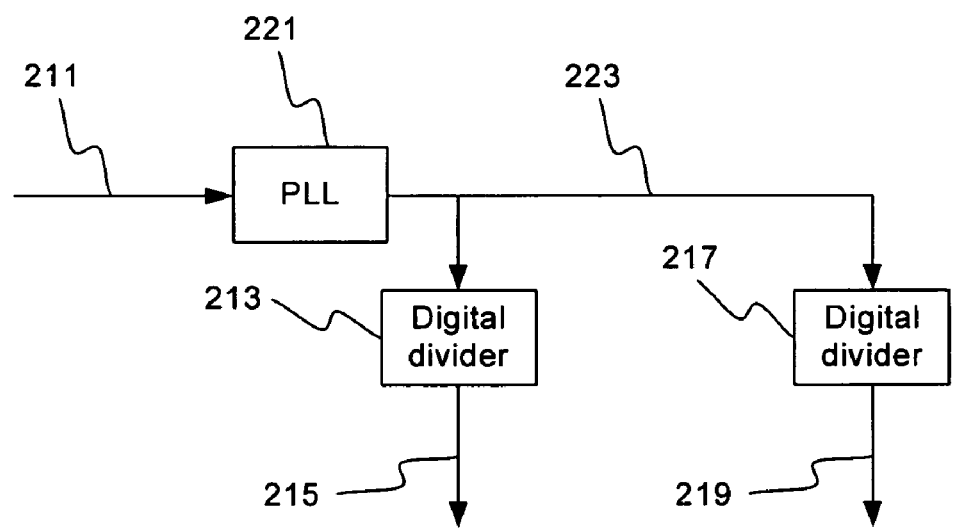
FIG. 1B illustrates a block diagram of an exemplary use of a PLL and a digital divider to generate clocks with frequencies having a non-digital relationship, in accordance with an embodiment of the present invention.

FIG. 1B illustrates a block diagram of an exemplary use of a PLL and a digital divider to generate clocks with frequencies having a non-digital relationship, in accordance with an embodiment of the present invention. In an embodiment of the present invention, a source clock 211 may have a lower frequency than the desired clock 215 and/or 219. In such an embodiment, the source clock 211 may be passed through a PLL 221 to generate a second clock 223 with a frequency equal to or greater than the highest desired frequency. The second clock 223 may then be treated as a source clock and a digital divider 213 may divide the new source clock 223 to generate the first clock 215, and a digital divider 217 may divide the new source clock 223 to generate the second clock 219. In an embodiment of the present invention, the new source clock 223 may be equal to the desired first clock 215, in which case the digital divider 213 may not be needed or may be bypassed.

Figure 2A:
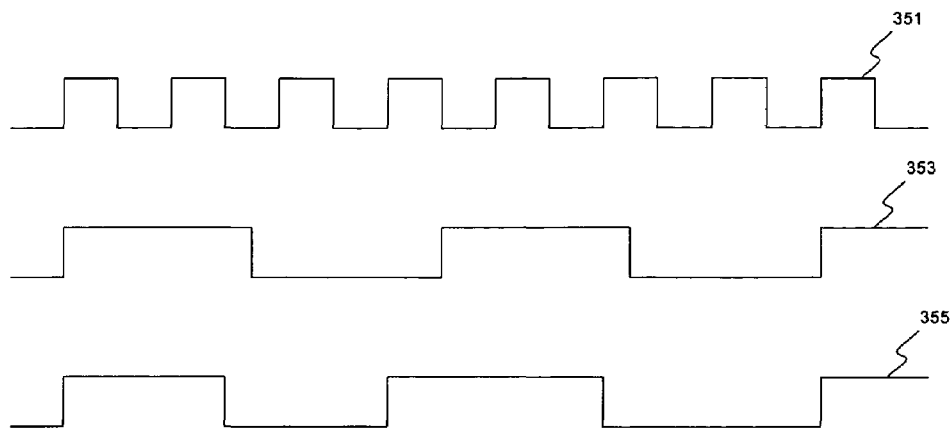
FIG. 2A illustrates plots of an exemplary output clock with a non-integral relationship to a source clock, in accordance with an embodiment of the present invention.

FIG. 2A illustrates plots of an exemplary output clock with a non-integral relationship with a source clock, in accordance with an embodiment of the present invention. A source clock may have a timing diagram 351. For example, it may be desired to produce an output clock 3.5 slower than the source clock, i.e.:

$$\frac{Freq(\text{input})}{Freq(\text{output})} = 3.5$$

Ideally, the output clock would have a cycle that would be equivalent to 3.5 cycles of the input clock 351. As such, the ideal output clock would have a timing diagram 353. However, in an embodiment of the present invention, the output clock may have a transition edge corresponding to a transition edge of the input clock 351. As a result, for this example, to get an output clock with a cycle equal to 3.5 cycles of the input clock 351, and at the same time keep the transition edges of the output cycle at transition edges of the input cycle 351, two different cycles may be used to generate the output clock. A cycle equal to 3 cycles of the input clock may be used, followed by a cycle equal to 4 cycles of the input clock, and the sequence may be repeated, 3, 4, 3, 4, etc. to produce an output clock 355. On average, as a result, since every 7 cycles of the input clock 351 end up as two cycles of the output clock 355, the ratio between the input and the output is 3.5 input cycles per output cycles. If, for example, the desired ratio is 3.6 instead of 3.5, the output clock 355 may have a cycle equal to 3 cycles of the input clock followed by a cycle equal to 4 cycles of the input clock, and the sequence may repeat, 3, 4, 3, 4, etc., but every once in a while there may be two cycles in a row with each being equal to 4 cycles of the input clock, such that on average the ratio is 3.6. For example, the sequence of output cycles may be 3, 4, 3, 4, 4, etc. resulting in 5 output cycles being equal to 18 input cycles, which may yield a ratio of 3.6.

Referring to the example with input to output frequency ratio of 3.5, the 3, 4, 3, 4, ... pattern may be broken up to avoid high amplitudes at undesirable frequencies that may cause unpleasant effects in systems such as, for example, audio systems where undesirable frequencies may become audible. In an embodiment of the present invention, error diffusion or dithering techniques may be applied to the pattern to break it up. As a result a noise term may be added to the signal, resulting in a pattern that is less periodic and as a result contains less of the undesirable frequencies. So instead of the pattern 3, 4, 3, 4, ... the pattern may become 3, 4, 3, 3, 4, 4, ... The noise added may have a zero mean, and as a result the overall average of the signal may not get affected.

In an embodiment of the present invention, a system may require several clocks at different frequencies where the relationship between the clocks may be non-integral. In such an embodiment, multiple digital dividers may be utilized to generate the needed number of clocks.

In an embodiment of the present invention, the input clock may have a higher frequency than the output clock. A decision may be made on each rising edge of the input clock as to whether a rising edge should be output of the output clock or not.

Figure 2B:
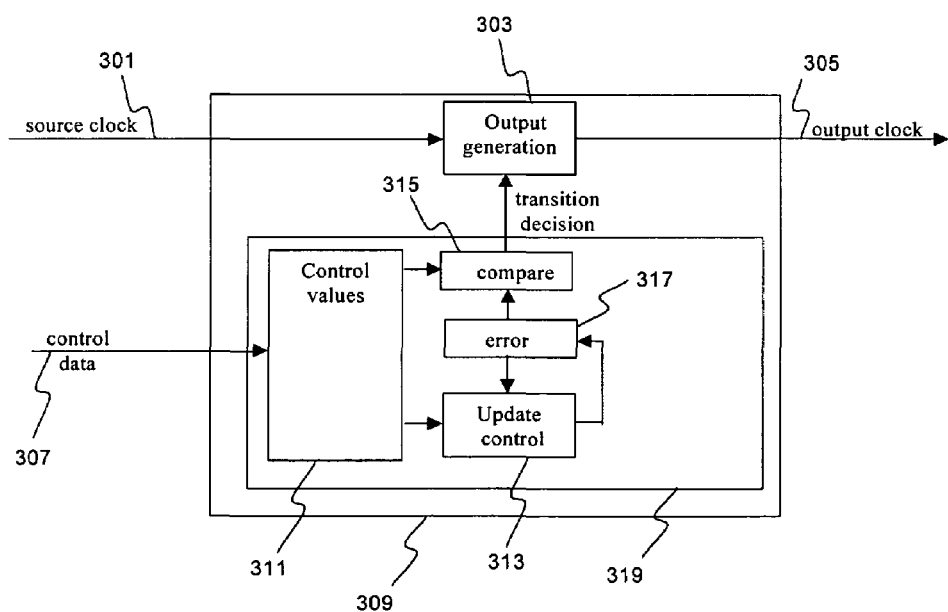
FIG. 2B illustrates a block diagram of an exemplary digital clock divider, in accordance with an embodiment of the present invention.

FIG. 2B illustrates a block diagram of an exemplary digital clock divider, in accordance with an embodiment of the present invention. In an embodiment of the present invention, an output clock 305 may be generated from a source clock 301 using a divider circuit 309, which may be controlled by a divider control algorithm such as, for example, a Bresenham-like algorithm, described hereinafter.

The divider control algorithm may allow for a binary decision to be made in the output generation circuit 303 (transition the output clock on a given input clock transition, or not). The divider control 319 may maintain an error 317, which may be used to keep track of the difference between the ideal and actual output transition point. At each decision point (input transition), the divider control 319 may determine if an output transition decision (allow transition or not) may minimize the accumulated error. The precision of the error value and related math operations may be increased until the total error is limited to a desired target for the desired length of operation.

In an embodiment of the present invention, a simple update control algorithm may involve minimizing the transition position error at each decision point. A variety of 'dithering' techniques may be added to the decision, which may eliminate any undesirable spectral characteristics that may occur. The type of dithering may be selected to allow for a variety of tradeoffs between complexity and quality of result.

The update control 313 and control values 311 may be set to achieve the closest approximation to 50% output clock duty cycle. In an embodiment of the present invention, the update control 313 and control values 311 may be used to achieve other duty cycles. In an embodiment of the present invention, the relationship between the output clock period (or phase time) and input clock period (or phase) may be any rational number less than or equal to one.

Figure 3:
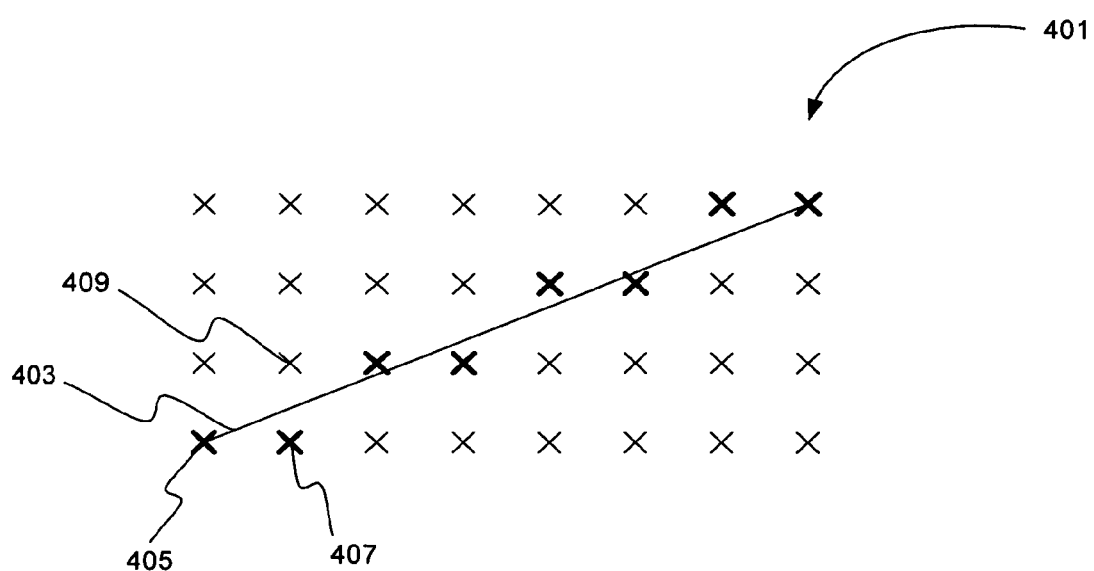
FIG. 3 illustrates a plot of an exemplary use of the Bresenham algorithm, in accordance with an embodiment of the present invention.

FIG. 3 illustrates a plot of an exemplary use of the Bresenham algorithm, in accordance with an embodiment of the present invention. The idea of the Bresenham algorithm may be thought of in terms of plotting lines on a plotter or a monitor, which may have well defined spatial position such as, for example, the pixels in the grid 401 indicated with an 'X'. The grid of pixels may allow use of the pixels to draw a line to represent the ideal line 403. The ideal line may have a starting point at a pixel 405, which may be used to draw the desired line represented with the pixels marked with 'X'. From the starting pixel 405, a step may be taken to the nearest two pixels. In this case, from pixel 405 a step may be taken to the pixel to the right and the pixel above it. The distance between each of the new pixels and the ideal line may be determined, and the pixel closest to the ideal line may be used in the estimation. In this case, the pixel to the right 407 is closer to the ideal line 403 than the pixel above 409, and as such used. The same technique may be repeated for each determined pixel until an estimate of the entire line is made, which may be indicated by the pixels 'X'. The pattern of the determined pixels may be drawn on a screen for estimating the ideal line.

The Bresenham algorithm may be implemented by determining how far off the ideal location an estimate point is. In an embodiment of the present invention, a similar concept may be utilized to create a clock edge in the process of generating the output clock using the input clock. The edges of the input clock may be analogous to the pixels of a screen that may be used to estimate a line, and may be used to create the edges of the output clock in estimating the ideal output clock with a non-integer relationship with the input clock. At every edge of the input clock, the difference between the edge and the where the edge of the ideal output clock would be may be added to an error term until the error term accumulates to a certain value such as, for example, a threshold. Once the threshold is achieved or passed, an actual edge may be created.

In an embodiment of the present invention, rising edges may be utilized to create edges for the output clock. Such an embodiment may be utilized where the duty cycle of the output clock may not be restricted to a certain value or may not be important to the design. In another embodiment of the present invention, the output clock may need to be 50%, in which case, both the rising and the falling edges of the input clock may be utilized such as, for example, the output clock illustrated in FIG. 2A. In yet another embodiment of the present invention, the control values in the divider circuit, illustrated in FIG. 2B, may be programmed such as to create edges in the output clock that correspond to a duty cycle as desired by a system designer.

In an embodiment of the present invention, the input clock may be used to generate a clock with twice the frequency of the input clock. A simple delay circuit may be used to delay the input clock such that each edge of the delayed version is exactly half way between two edges of the input clock. Each edge of the input clock and the delayed version of the input clock may be used for edges of an output clock with a frequency that is exactly double the frequency of the input clock.

Figure 4:
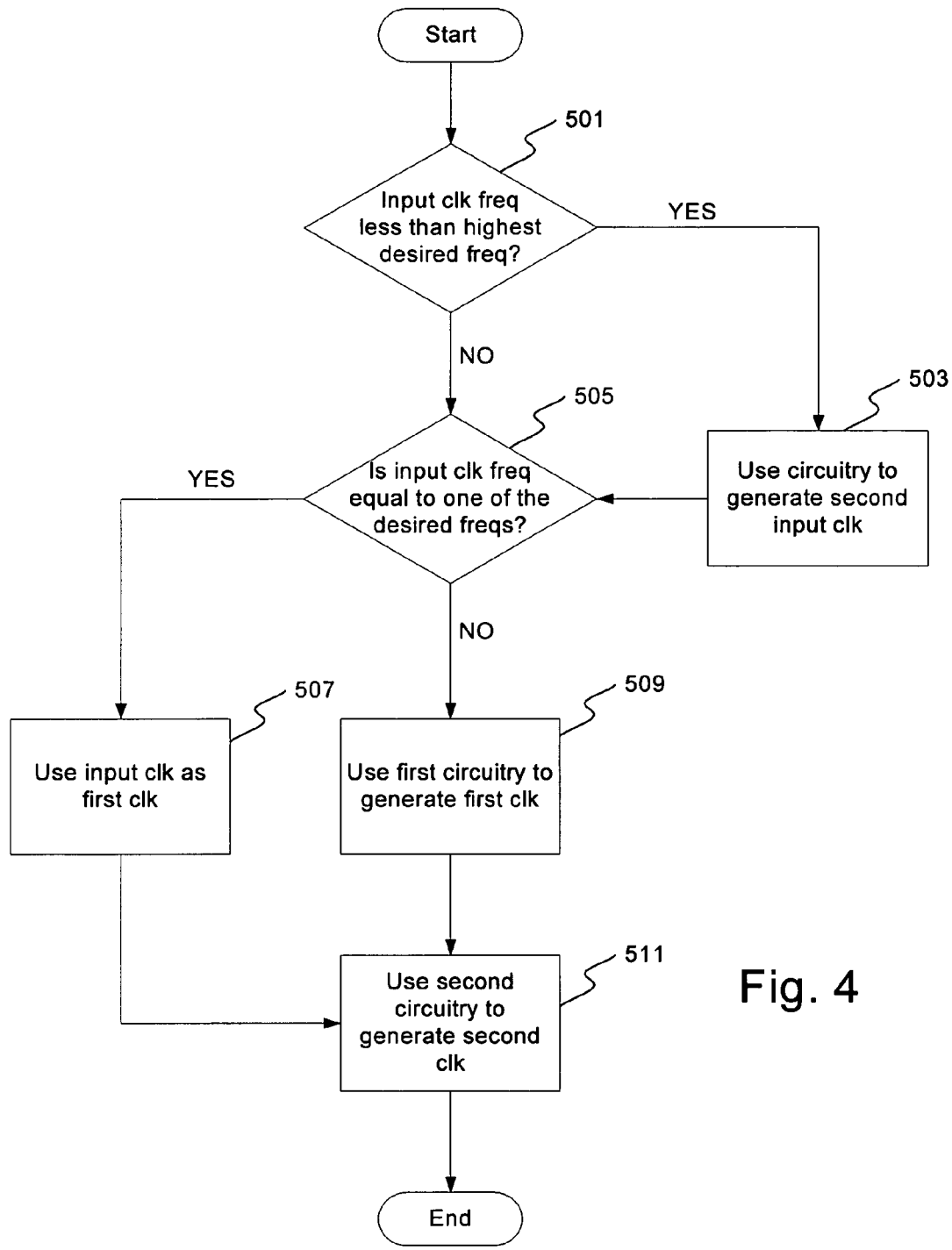
FIG. 4 illustrates a flow diagram of an exemplary process of using a digital divider to generate clocks with frequencies having a non-digital relationship, in accordance with an embodiment of the present invention.

FIG. 4 illustrates a flow diagram of an exemplary process of using a digital divider to generate clocks with frequencies having a non-digital relationship, in accordance with an embodiment of the present invention. At 501 it may be determined whether the frequency of the input clock is lower than at least one of the desired output clock frequencies, and if so, circuitry may be used to utilize the first input clock to generate a second input clock with a frequency larger than or equal to the highest of the desired frequencies, at 503. The circuitry used in 503 may be, for example, a PLL. The process may then proceed to a next block 505. If at 501 it is determined that the input clock frequency is larger or equal to the highest of the desired frequencies, the process may proceed to 505 where it may be determined whether the input frequency is equal to one of the desired frequencies. If so, at 507 the input clock may be used as a first clock such as, for example, a clock to drive audio components in a system. A second circuitry may then be used to generate a second clock utilizing the input clock, at 511. The second clock may be used, for example, to drive video components in the system.

If at 505 it is determined that the input clock frequency is not equal to any of the desired clock frequencies, a first circuitry may be used to generate a first clock utilizing the input clock, at 509. The first close may be used, for example, to drive audio components in the system. Then at 511, a second circuitry may then be used to generate a second clock utilizing the input clock, at 511. The second clock may be used, for example, to drive video components in the system.

In an embodiment of the present invention, there may be more than two clocks generated. In such an embodiment, several circuits may be utilized to generate each of the clocks using the input clock.

An embodiment of the present invention may be utilized in an audio/video ASIC decoder. Different clocks within the ASIC may control the audio and video decoders. By maintaining a specific non-integral rational relationship between the two clocks, the decoded audio and video data may not drift in time relative to each other. An embodiment of the present invention may be applied in any digital design environment (e.g. PLDs, FPGAs, other discrete board level components). The targeted environment may not be limited to audio/video synchronization, but may also include any system where two or more clock domains need to operate without relative drift.

The present invention may be realized in hardware, software, firmware and/or a combination thereof. The present invention may be realized in a centralized fashion in at least one computer system, or in a distributed fashion where different elements are spread across several interconnected computer systems. Any kind of computer system or other apparatus adapted for carrying out the methods described herein may be suitable. A typical combination of hardware and software may be a general-purpose computer system with a computer program that, when being loaded and executed, controls the computer system to carry out the methods described herein.

The present invention may also be embedded in a computer program product comprising all of the features enabling implementation of the methods described herein which when loaded in a computer system is adapted to carry out these methods. Computer program in the present context means any expression, in any language, code or notation, of a set of instructions intended to cause a system having information processing capability to perform a particular function either directly or after either or both of the following: a) conversion to another language, code or notation; and b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for generating a second clock from a first clock, wherein the ratio of the frequency of the first clock to the frequency of the second clock is a non-integer, the method comprising:
generating cycles of the second clock, utilizing rising and falling edges of the first clock, wherein said cycles of the second clock have the duration of a first number of cycles of the first clock;
generating other cycles of the second clock, wherein the other cycles have the duration of a second number of cycles of the first clock;
calculating a first timing error between a time associated with a first edge of the first clock and a time for an edge at the frequency for the second clock;
calculating a second timing error between a time associated with a second edge of the first clock and the time for an edge at the frequency for the second clock;
generating an edge at the time of the first edge if the first timing error is less than the second timing error; and
generating an edge at the time of the second edge if the second timing error is less than the second timing error.

2. The method of claim 1, wherein the absolute difference between the first number and the second number is one.

3. The method of claim 1, wherein the second clock is used with video-related content.

4. The method of claim 1, wherein the second clock is used for audio-related content.

5. The method of claim 1, comprising:
breaking up a pattern of generated cycles and generated other cycles of the second clock.

6. The method of claim 5, wherein said breaking up comprises using error diffusion techniques.

7. The method of claim 5, wherein said breaking up comprises using dithering techniques.

8. The method of claim 1, comprising:
adding a noise term to the second clock.

9. The method of claim 1, wherein the second clock is used to drive audio components.

10. The method of claim 1, wherein the second clock is used to drive video components.

11. The method of claim 1, wherein the second clock is used in an audio/video ASIC decoder.

12. The method of claim 1, wherein the method is used for audio/video synchronization.

* * * * *